Jan. 22, 1963  A. G. WITT  3,074,394
HEATED CONTAINER FOR TRANSPORTING FOOD
Filed March 25, 1960  2 Sheets-Sheet 1
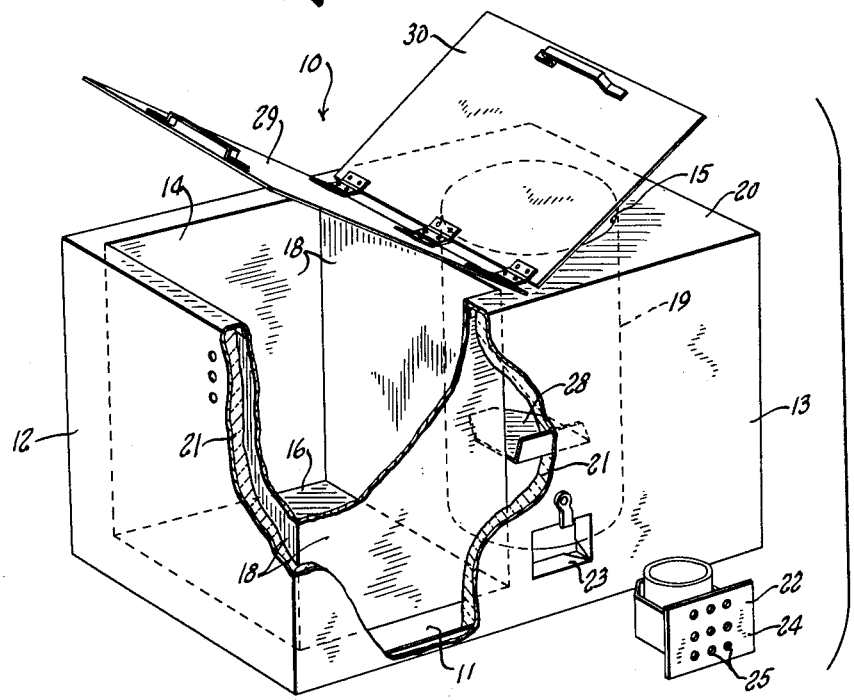
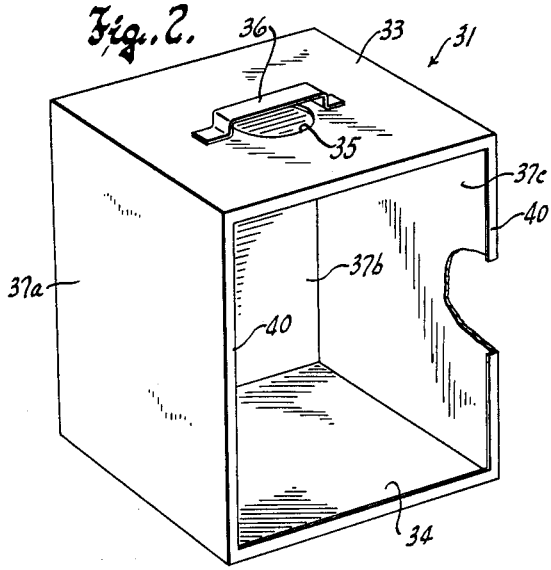
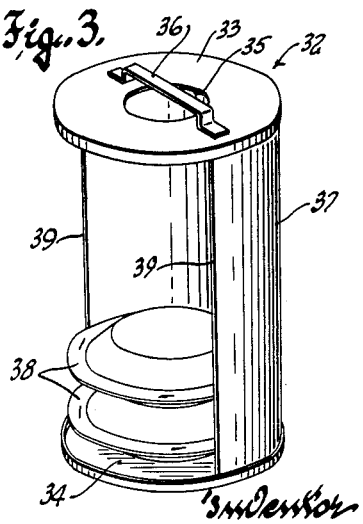
Inventor
Alwin G. Witt
By Ira Milton Jones
Attorney

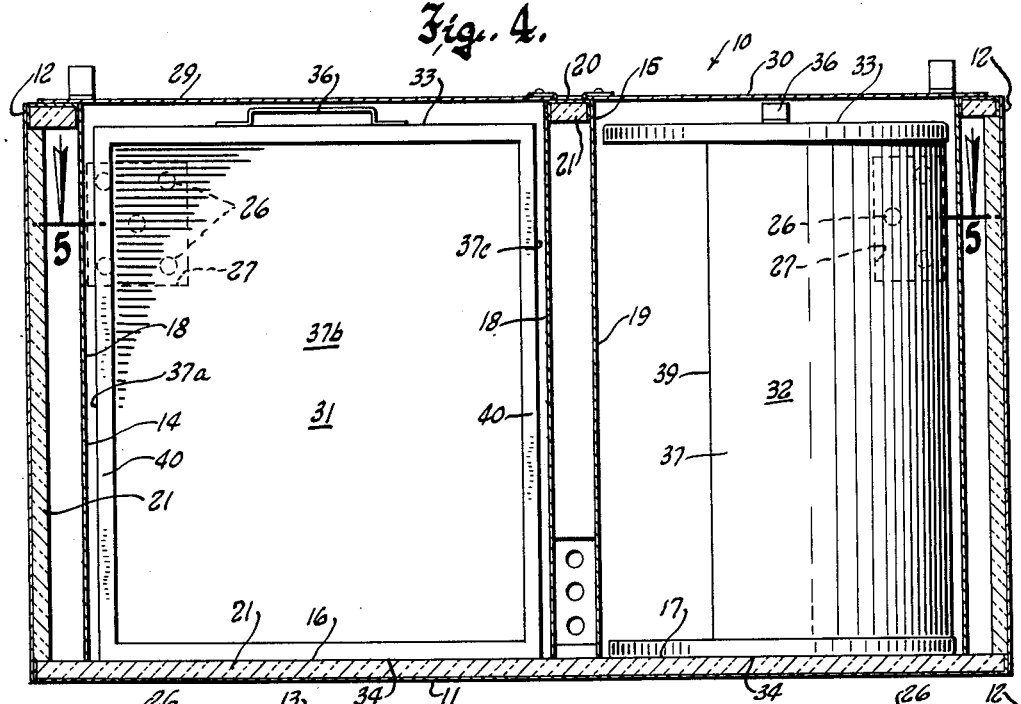

3,074,394
HEATED CONTAINER FOR TRANSPORTING FOOD
Alwin G. Witt, 4136 W. Brown Deer Road, Milwaukee, Wis.
Filed Mar. 25, 1960, Ser. No. 18,224
1 Claim. (Cl. 126—261)

This invention relates to food transporting devices and refers more particularly to a heated container in which cooked ready-to-eat food may be transported so as to reach the consumer in hot palatable condition.

It is a particular object of this invention to provide a heated container for transporting food which is especially well adapted for the delivery of such popular food items as pizza and prepared chicken dinners. There are now many establishments which make a specialty of preparing such foods and delivering the same in ready-to-eat form, but heretofore great difficulty has been experienced in keeping the food hot and palatable, especially if the weather was cold and any appreciable time was required in the delivery.

This invention overcomes this difficulty through the provision of a simple heated container which may be easily transported in any light delivery truck, station wagon or the like, and which is so designed and constructed that it can hold a substantial number of prepared dinners or pizza pies in a manner making them readily accessible for delivery to the individual homes.

With the above and other objects in view which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed according to the best mode so far devised for the practical application of the principles thereof, and in which:

FIGURE 1 is a perspective view of the heated food container of this invention, with parts broken away and in section, and with the food carriers or receptacles removed therefrom;

FIGURE 2 is a perspective view of one of the two removable food carriers or receptacles with which the container is equipped;

FIGURE 3 is a perspective view of the other removable food carrier or receptacle;

FIGURE 4 is a longitudinal vertical sectional view through the container with the removable food carriers or receptacles in place; and FIGURE 5 is a horizontal sectional view through the container.

Referring now particularly to the accompanying drawings, the numeral 10 designates generally the portable food container of this invention and which comprises a box preferably formed of sheet metal, and having a bottom 11 and upstanding end and side walls 12 and 13, respectively. The box is rectangular in horizontal cross section and contains two open-topped food receiving wells 14 and 15, the former being square in cross section and the latter round. These wells have bottom walls 16 and 17, respectively, and upright side walls 18 and 19, respectively.

The upper edges of the upright walls of the two wells, and the upper edges of the end and side walls 12 and 13 of the box are connected by a top wall 20. Thus, the top wall 20 supports the wells and holds them in position spaced from the adjacent walls of the box.

All of the walls of the box are lined with solid insulation 21, which may be clinched or otherwise held to the walls it lines. At the bottom, the insulation 21 substantially fills the space between the bottom wall 11 of the box and the bottoms 16 and 17 of the two wells; but the insulation covering the end and side walls of the box is spaced from the adjacent walls of the wells so that a hot air space is provided inside the box surrounding both wells. This hot air space provides for the circulation of hot combustion gases emanating from the combustion of fuel in a fuel receptacle 22.

The fuel receptacle may be in the form of a drawer inserted into the container through a hole 23 in the medial lower portion of one of its side walls. The receptacle 22 is of a size to hold a can of fuel such as that sold under the trademark "Sterno," and, as clearly shown in FIGURE 1, has a front wall 24 provided with air inlet openings 25 through which combustion supporting air reaches the fuel.

Upon ignition of the fuel, and insertion of the fuel receptacle into the opening 23 in the box, the hot combustion gases emanating from the burning fuel circulate through the hot air space and around both wells. Such circulation is assured by the provision of vent holes 26 formed in the end and side walls of the box in line with openings 27 cut through the adjacent insulation. One set of the holes is located in the end wall 12 of the box adjacent to the square well, and three sets of these holes are located in the side wall of the box opposite the one at which the combustion zone is located, and which might be considered the back wall. In all cases, the vent holes are located near the top of the box.

The described location of the vent holes, together with a baffle 28 mounted in the hot air space above the combustion zone, assures the desired circulation of combustion gases and a uniform temperature throughout the entire container.

The baffle 28 is conveniently provided by simply attaching a shelf-like plate to the adjacent side wall 13 above the hole 23 therein.

The open tops of the two wells 14 and 15 are closed by hinged covers 29 and 30, respectively, and each of the two wells contains a removable food carrier or receptacle. Thus there is a substantially square carrier or receptacle 31 to fit the square well 14 and a round carrier or receptacle 32 for the round well 15. Both have flat top and bottom walls 33 and 34, the former having a hole 35 at its center and a handle 36 by which the carrier or receptacle may be lifted out of its well and carried.

Both carriers or receptacles also have a side wall 37 which, in the case of the square receptacle, comprises three sides 37a, 37b and 37c and, in the case of the round receptacle, consists of one continuous curved wall. Hence, the receptacles have an open side through which individual food containers may be inserted and removed. Usually the prepared food is delivered in individual servings in covered paper plates, as indicated for instance at 38—the covers generally being provided by a second paper plate stapled to the first about the edges. The round carrier or receptacle 32 is particularly adapted to the carrying of food in such covered paper plate containers, and to assure against accidental displacement of these covered containers from the receptacle, the side wall 37 of the round receptacle extends for somewhat more than half the circumference of its top and bottom walls. Accordingly, the distance between the opposite edges 39 of the side wall 37 is less than the diameter of the covered plates. Insertion and removal of the covered plates thus entails tilting them slightly, or else springing the side edges 39 out of their normal positions. In any event, the described dimensional relationship assures against accidental dislodgement of the covered plates from the carrier or receptacle, it being understood that the covered plates are stacked one upon the other in the carrier or receptacle.

The square carrier or receptacle has the side edges 40 of its walls 37a and 37c provided with inturned flanges for stiffness; and, being square, provides for the reception of a variety of differently shaped individual food containers.

From the foregoing description taken together with the accompanying drawings, it will be readily apparent that this invention provides an exceptionally convenient and practical way of delivering prepared ready-to-eat food in hot palatable condition, and that the invention is especially well adapted for the delivery of such presently popular foods as fried chicken dinners and pizza pies.

What is claimed as my invention is:

A heated container for transporting cooked ready-to-eat food in hot palatable condition comprising: a box having bottom, top and upright side walls, one of said walls having an opening; a door hinged to said wall to close said opening; a food receiving compartment inside the box defined by upright inner walls spaced from said side walls of the box and joined to the wall of the box having the opening therein along the edge of the opening so that the opening affords an inlet to the food compartment, and the space between the walls of the food compartment and the adjacent walls of the box forms an enclosed hot air space, one of the upright side walls of the box having a hole into the hot air space, said hole being spaced above but near the bottom wall and extending above the level of the bottom of the food receiving compartment; a drawer slidably received in said hole to provide a container for fuel to be burned, said drawer when in place being located in a portion of said hot air space between the upright side wall of the box in which said hole is located and an adjacent upright inner wall so that air in the hot air space may circulate from below the drawer directly upwardly into the portion of the hot air space above the drawer; and a baffle fixed to the wall of the box in which said drawer receiving hole is located, said baffle being above and in line with the drawer-receiving hole and projecting substantially horizontally inwardly from its connection with the upright side wall to which it is fixed to overlie the drawer and the fuel therein so as to direct the hot air rising from fuel burning in the drawer and cause the same to commingle with the upwardly flowing air in the hot air space.

References Cited in the file of this patent

UNITED STATES PATENTS

| | | |
|---|---|---|
| 618,317 | Anderson | Jan. 24, 1899 |
| 782,921 | Prenatt | Feb. 21, 1905 |
| 810,229 | Stange | Jan. 16, 1906 |
| 945,302 | Brown | Jan. 4, 1910 |
| 1,022,246 | Koretz | Apr. 2, 1912 |
| 1,058,601 | Knittel | Apr. 8, 1913 |
| 1,435,521 | Heimerl | Nov. 14, 1922 |
| 2,544,053 | Sharaf | Mar. 6, 1951 |